US008294085B2

(12) United States Patent
Ding

(10) Patent No.: US 8,294,085 B2
(45) Date of Patent: Oct. 23, 2012

(54) MASS SPECTROMETRIC ANALYZER

(75) Inventor: Li Ding, Manchester (GB)

(73) Assignee: Shimadzu Research Laboratory (Shanghai) Co. Ltd., Shanghai (CN)

( * ) Notice: Subject to any disclaimer, the term of this patent is extended or adjusted under 35 U.S.C. 154(b) by 0 days.

(21) Appl. No.: 13/140,346

(22) PCT Filed: Dec. 22, 2009

(86) PCT No.: PCT/CN2009/075813
§ 371 (c)(1),
(2), (4) Date: Jun. 16, 2011

(87) PCT Pub. No.: WO2010/072137
PCT Pub. Date: Jul. 1, 2010

(65) Prior Publication Data

US 2011/0240845 A1 Oct. 6, 2011

(30) Foreign Application Priority Data

Dec. 22, 2008 (CN) .......................... 2008 1 0207492

(51) Int. Cl.
*H01J 49/40* (2006.01)
*H01J 49/26* (2006.01)
*B01D 59/44* (2006.01)

(52) U.S. Cl. ........ 250/281; 250/282; 250/283; 250/286; 250/287; 250/396 R; 250/397

(58) Field of Classification Search .................. 250/281, 250/282, 283, 286, 287, 396 R, 397
See application file for complete search history.

(56) References Cited

U.S. PATENT DOCUMENTS

| | | | | |
|---|---|---|---|---|
| 5,880,466 | A | 3/1999 | Benner | |
| 6,888,130 | B1 * | 5/2005 | Gonin | 250/287 |
| 7,265,346 | B2 * | 9/2007 | Whitehouse et al. | 250/287 |

(Continued)

FOREIGN PATENT DOCUMENTS

| | | | |
|---|---|---|---|
| DE | 4408489 | A1 | 9/1995 |
| GB | 2080021 | A | 1/1982 |
| JP | 11135060 | A | 5/1999 |

(Continued)

OTHER PUBLICATIONS

K. G. Bhushan et al., Electrostatic ion trap and Fourier transform measurements for high-resolution mass spectrometry, American Institute of Physics, 2007, p. 083302-1-083302-5, vol. 78, No. 8.

*Primary Examiner* — Nikita Wells
(74) *Attorney, Agent, or Firm* — Morris Manning & Martin LLP; Tim Tingkang Xia, Esq.

(57) ABSTRACT

A mass spectrometric analyzer and an analysis method based on the detection of ion image current are provided. The method in one embodiment includes using electrostatic reflectors or electrostatic deflectors to enable pulsed ions to move periodically for multiple times in the analyzer, forming time focusing in a portion of the ion flight region thereof, and forming an confined ion beam in space; enabling the ion beam to pass through multiple tubular image current detectors arranged in series along an axial direction of the ion beam periodically, using a low-noise electronic amplification device to detect image currents picked up by the multiple tubular detectors differentially, and using a data conversion method, such as a least square regression, to acquire a mass spectrum.

15 Claims, 10 Drawing Sheets

U.S. PATENT DOCUMENTS

| | | | | |
|---|---|---|---|---|
| 7,429,728 | B2 * | 9/2008 | Enke | 250/282 |
| 2005/0092913 | A1 | 5/2005 | Ishihara | |
| 2006/0192110 | A1 | 8/2006 | Yamaguchi | |
| 2007/0221862 | A1 | 9/2007 | Suits et al. | |

FOREIGN PATENT DOCUMENTS

| | | | |
|---|---|---|---|
| JP | 11135061 | A | 5/1999 |
| WO | 02103747 | A1 | 12/2002 |

* cited by examiner

MASS SPECTROMETRIC ANALYZER

FIELD OF THE INVENTION

The present invention relates generally to the field of mass spectrometric analysis technologies, and more particularly to a mass spectrometric analyzer that utilizes an image current to perform non-destructive detection on high-velocity moving ions.

BACKGROUND OF THE INVENTION

Many common mass spectrometer products have been developed since the development of mass spectrometry. In an existing mass spectrometer, methods for detecting an ion signal are categorized into: a destructive detection type and a non-destructive detection type. In destructive detection, ions after passing through an analyzer are received by a Faraday cup or a dynode. Charges of the ions are transformed into a current on the Faraday cup, and are amplified by a circuit, or ions are firstly converted to electron and then multiplied by the dynode and their charges are detected. After detection, the ions are neutralized to disappear on the Faraday cup or the dynode. Conventionally, the detection method of this type is used by most mass spectrometers, for example, a quadrupole mass spectrometer, an ion trap mass spectrometer, a magnetic sector mass spectrometer, and a Time of Flight (ToF) mass spectrometer.

When charged particles move to be near a conductor, the so-called "image charges" of an opposite polarity are induced in the conductor, and a current is incurred in a circuit connected to the conductor. By using the method, charges moving near an electrode can be measured, and at the same time of the measurement, the charged particles are not neutralized to disappear. Therefore, the detection method is a non-destructive ion detection method. Recently developed Fourier Transform Ion Cyclotron Resonance (FTICR) mass spectrometers and Orbitrap mass spectrometers use the method. In analyzers of the two types of mass spectrometers, ions constrained in a magnetic field or an electric field oscillate to and fro, so an image current is induced at one of the electrodes on the analyzer, and a frequency of periodic variation of the image current is a frequency of oscillation of the ions in the magnetic field or the electric field, so that a spectrum acquired by performing the Fourier transform on the image current reflects the mass spectrum of the ions in a trap. Substantially, in the non-destructive detection method, ions can be detected for multiple times in a magnetic field or an electric field within a life cycle of the oscillatory motion, and the time as well as the flight path are effectively increased, so that a very high mass resolution can be acquired.

When reflectors are used in a ToF mass spectrometer, the time and flight path are also effectively increased, thereby a high mass resolution is achieved. Wollnik discloses an analyzer in UK Patent No. GB 2080021A, in which ions fly to and fro between two reflectors for multiple times, and the analyzer is also referred to as a multi-turn ToF analyzer, which has a very high mass resolution. Definitely, the ions are eventually led out to undergo destructive detection after a voltage of one of the reflectors is switched. A problem of the mass spectrometer is that: if a mass range of measured ions is large, the motion cycle time of ions of light mass is obviously shorter than that of ions of heavy mass, and during to and fro movement, the ions of light mass will overtake the ions of heavy mass by one or more turns, so that in the detected mass spectrum, ions of different mass overlap. Therefore, the mass spectrometer can only analyze a small mass range of ions.

By using an electrostatic deflector, a flight tube may also be designed to be of a loop orbit type. In Japanese Patent Nos. H11-135060 and H11-135061, loop-orbit ToF analyzers are introduced. YAMAGUCHI describes a ToF analyzer including a straight out letting flight tube and an 8-shaped loop orbit in US 2006192110 (A1). However, the aforementioned devices also have the problem of small mass range.

Although we can use a mass pre-selection method to limit the mass range of ions to entering the analyzer, and then stitch many mass spectra of a small range into a mass spectrum of a wide mass range by software, many difficulties will be encountered during practical operation, for example, mass errors occur at joints. It is neither easy to introduce an internal mass standard for calibration, and high-precision mass analysis cannot be achieved. In US2005092913 (A1), Ishihara discloses a method of using multiple overlapping mass spectra of difference turns to resolve non-overlapping mass spectra. However, the method requires spectrum acquisition to be performed on a sample for multiple times in different instrument settings, and during the multiple times of the spectrum acquisition, it must be ensured that components of the sample do not change, which obviously brings difficulties to application, and affects the efficiency of analysis.

When a non-destructive detector is used, ions of different mass and ion signals of different turns can be detected by only injecting sample ions once, and a mass spectrum can be acquired by certain conversion methodology. The method has been successfully implemented in FTICR mass spectrometers and Orbitrap mass spectrometers, so is also applicable to a ToF type mass spectrometer. H. Benner discloses an electrostatic ion trap in a U.S. Pat. No. 5,880,466A, which is in fact an electrostatic flight tube having two reflectors. Ions are reflected to and fro between the two reflectors, and the ions have a very high velocity in a drift region between the two reflectors. When the ions pass through a cylindrical electrode, image charges are induced on the electrode, and a circuit connected to the electrode can detect a pulse signal. Zajfman describes in a patent entitled "ION TRAPPING" (WO02103747 (A1)) an electrostatic ion beam trap having two reflectors, and acquiring an image current by using a ring detector. An ion mass spectrum is acquired by performing the Fourier transform on an image current signal.

Intensity of an image current is normally very low. Even if an ion source generates $10^4$ ions of the same mass-to-charge ratio, and the ions move in a compact group, a pulse image current signal thereby generated can just be detected by a low-noise amplifier. However, after multiple times of to and fro movement, the ions in an ion group disperse gradually due to differences in their initial kinetic energy, the image current signal broadens in time and decreases in intensity, until becoming undetectable eventually. The longer the record time of the image current signal is, and the larger the number of times of detection is, the higher the precision of mass spectra acquired by conversion will be. Therefore, it is hoped that ions move to and fro in a flight tube for hundreds or thousands of times. In order to prevent an ion signal from attenuating, Zajfman proposes using nonlinearity of reflectors and coulomb interaction between ions to achieve bunching of an ion group, so as to enable the ions flying in the flight tube not to disperse after hundreds of times of to and fro motion. However, when the bunching based on the coulomb interaction is applied to a mass spectrometer for analyzing a complex ion combination, and especially in the presence of many satellite peaks, large peaks hijack small peaks, which affects resolving power and reduces the precision of the analyzer.

Obviously, in order to improve the sensitivity of the detector, technologies for detecting an image current have to be improved, so as to pick up a sufficient image current signal even when the number of the ions is small.

In addition, effective processing on the ion signal acquired by the detector is also a key to improve the sensitivity of detection. In existing Fourier transform mass spectrometers (for example, an FTICR mass spectrometers and an ORBITRAP mass spectrometer), an image current signal generated by ions of certain mass is close to a sine function or a cosine function, and an image current signal generated by ions of different mass is a superposition of sine wave signals of multiple frequencies, on which a spectrum signal acquired by performing the Fourier transform corresponds to a unique mass spectrum.

When the image current detection is applied for a multi-turn ToF type analyzer, the acquired signal is normally not a sine function or a cosine function. Even a signal generated by ions of a single mass-to-charge ratio has a complex spectrum, which includes a base frequency of the signal and various high harmonics. Therefore, it is necessary to choose a new signal analysis method.

SUMMARY OF THE INVENTION

One objective of the present invention is to improve the ion detection efficiency of non-destructive ion detection in a multiturn type mass spectrometric analyzer.

Another objective of the present invention is to solve the problems that an existing image current detector does not generate a good signal waveform, and ion motion direction cannot be represented by the polarity of ion image current signal.

Meanwhile, the present invention provides an effective mathematical conversion processing method for an image current signal acquired by the improved detector.

In order to solve the above technical problems, a technical solution according to the present invention is to provide a mass spectrometric analyzer based on detection of an ion image current, which includes electrostatic reflectors or electrostatic deflectors, for enabling pulsed ions to be analyzed to move therein periodically for multiple times, form time focusing for an ion group in a portion of the ion flight region thereof, and form a confined ion beam; multiple tubular image current detectors arranged in series along an axial direction of the ion beam are disposed, and ion groups are allowed to pass through the multiple tubular image current detectors; a low-noise electronic amplification device connected to the tubular image current detectors, for differentially detecting image currents picked up by the multiple tubular detectors; and a data processing facility, for converting a differential image current signal into a mass spectrum.

The above mentioned ion groups may be generated or have their motion accelerated by mean of a pulse, so they may also be called pulsed ions.

According to another aspect of present invention there provides a method of mass spectrometric analysis using a multi-turn flight tube analyzer, including: disposing electrostatic reflectors or electrostatic deflector in the analyzer, so as to enable pulsed ions to be analyzed to move therein periodically for multiple times, form time focusing in a partial region thereof, and form an confined ion beam in space; enabling the ion beam to pass through multiple tubular image current detectors arranged in series along an axial direction of the ion beam periodically; using a low-noise electronic amplification device to detect image currents picked up by the multiple tubular detectors differentially; and using a digital conversion method to perform data conversion on an amplified signal to acquire a mass spectrum.

In an embodiment, a method for converting an image current acquired by above mentioned mass spectrometric analyzer into a mass spectrum is provided, in which a digital fast Fourier transform method plus a stepwise complex frequency spectrum deconvolution method is used.

In another embodiment, a method for converting an image current into a mass spectrum is provided, in which an orthogonal projection method is used to acquire basis function coefficients. The orthogonal projection method used in the embodiment is further suggested to be equivalent to the process of a least square regression.

Compared with the prior art, the present invention has the following obvious advantages by adopting the above technical solutions.

1. In case of a circulating multi-turn flight tube, a single-cylinder detector can only detect a signal once during each cycle of flight. Even if in a reflective reciprocating multi-turn flight tube, image current signal can only be detected twice. Therefore amount of the signal extracted is very small with single cylinder detector. When a dual-cylinder detector is used, different image currents are induced by ions passing through two cylinders. A sum of or a difference between the two image currents can be used. When the difference between the two image currents is used, a signal of larger amplitude than that obtained by the single-cylinder detector can be acquired.

2. In a straight reflective reciprocating multi-turn flight tube (also called electrostatic ion beam trap), polarities of signals of ion groups passing through a single detector are the same for in to and fro directions. When a dual-cylinder detector of the present invention is used, if ions enter a first detection electrode and come out from a second detection electrode, the polarity of a differential signal is positive; while if the ions enter the second detection electrode and come out from the first detection electrode, the polarity of the differential signal is negative, so that the polarity of the signal reflects an injecting direction of the ions.

3. In case a row of multiple cylinder detection electrodes are positioned in series coaxially, and ions are injected from one end, a pulse image current is induced on each cylinder at different timing. Differential signal between adjacent cylinder detectors can be recorded, and the differential signal is then added up to the differential signal of next adjacent detection electrodes, and so on. A pulse signal sequence corresponding to time is obtained where high frequency components are significantly enhanced compared with high frequency components detected by a single detection cylinder. The high frequency components have a close relationship with the velocity of the pulsed ions, a mass spectrum can be acquired by performing proper conversion on the signal, and the signal-to-noise ratio can be increased.

BRIEF DESCRIPTION OF THE DRAWINGS

The accompanying drawings illustrate one or more embodiments of the invention and, together with the written description, serve to explain the principles of the invention.

DETAILED DESCRIPTION OF THE INVENTION

First, a basic structure of a reciprocating multi-reflection flight tube is used to describe an analyzer according to an embodiment of the present invention.

Figure 1:
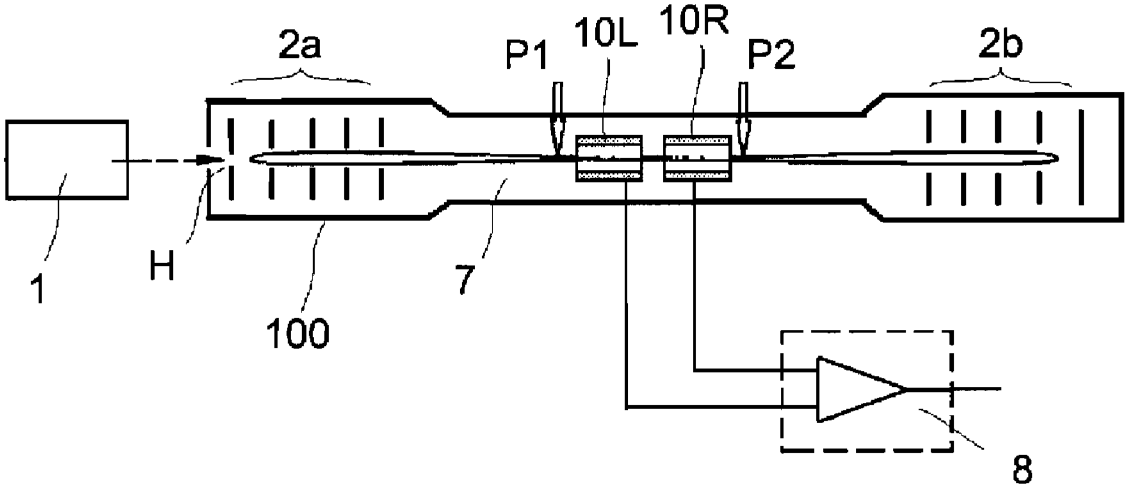
FIG. 1 illustrates a multi-turn reflector-type mass spectrometer system having a pair of image current detectors according to one embodiment of the present invention.

A flight tube 100 in FIG. 1 includes two opposite reflectors 2*a* and 2*b*, a pulsed ion beam Ib generated by the pulsed ion source 1 can be introduced through a small hole H in the end electrode of the reflectors. After ions are introduced, some electrode voltages in the reflectors 2*a* should be restored to voltage values of normal reflective mode. In this way, the ions can be reflected continuously between the two reflectors.

For a positive ion mode, positive voltages need to be applied on some electrodes in the reflectors. The electric potential in the reflectors may be as high as thousands of volts or tens of thousands of volts relative to a drift space 7, so that the ions have kinetic energy ranging from thousands of electron-volts to tens of thousands of electron-volts when reflected to the drift region 7. The ions move to and fro in a reflector region and the drift region in the form of a pulsed ion beam, and induce image charges in conductors in the regions. However, in actual design, no clear boundary is defined for the reflector region and the drift region, so that the reflector region and the drift region are herein collectively referred to as an ion flight region. A pair of cylindrical detection electrodes 10L and 10R being coaxial with the ion beam are mounted in the ion drift space 7 in the ion flight region, which are connected to a differential amplifier 8 respectively.

A well-designed reflector shall meet the isochronous condition. The so-called isochronism refers to that when the mass-to-charge ratios of the ions in a group are the same, the group of ions can all return to a point at the same time after being reflected, even if initial kinetic energy is slightly different, thereby forming so-called time focusing. For example, if ions in an ion group setting out from a point P1 can return to a point P2 at the same time after being reflected by the reflector 2*b*, the reflector meets the isochronous condition. A very high mass resolution can be acquired by placing an ion detector at the isochronous point P2. Likewise, if the reflector 2*a* also meets the isochronous condition, and can enable ions in an ion group setting out from the point P2 to return to the point P1 at the same time after the ion group is reflected, a multi-turn flight tube formed by the pair of the reflectors is an isochronous electrostatic ion trap. Ions of the same mass-to-charge ratio achieve the time focusing repeatedly during the movement, so they do not disperse rapidly. Of cause, the time focusing cannot be ideal, and the ion group eventually disperse to the whole movement region gradually (for example after hundreds of milliseconds), so that an image current disappears.

Figure 2:
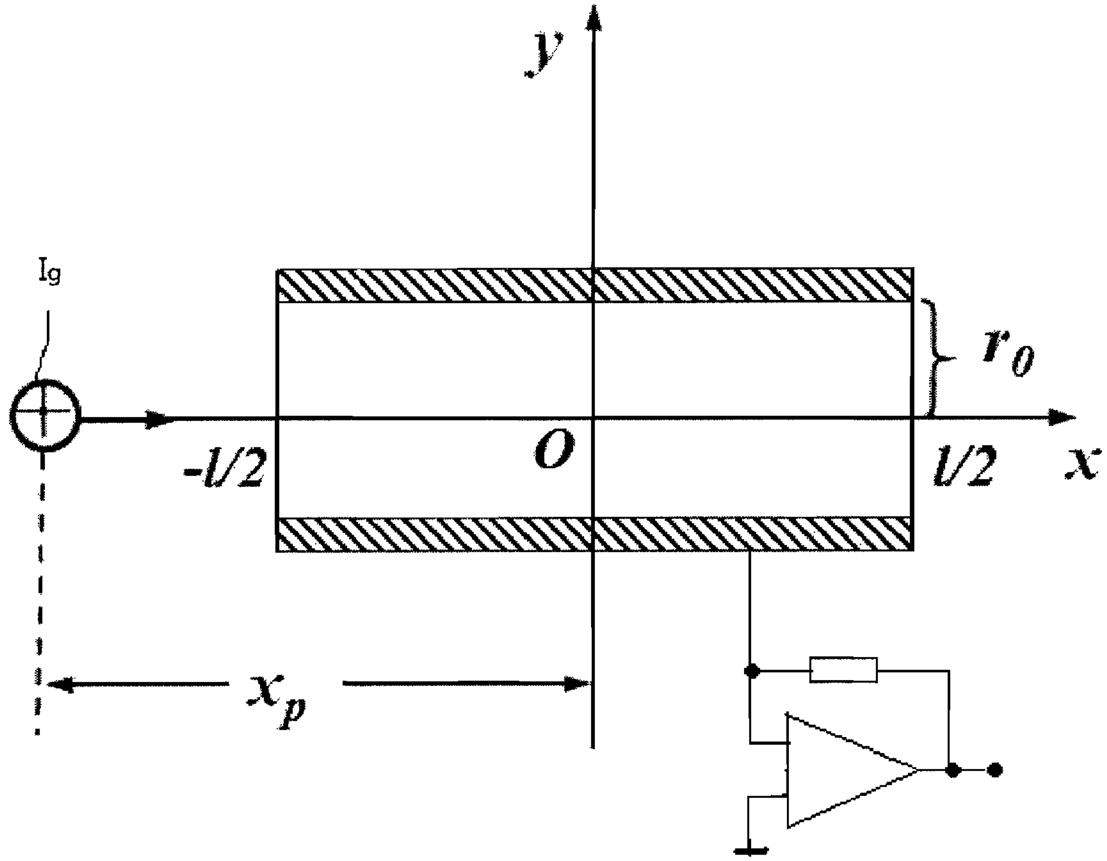
FIG. 2 illustrates a single-cylinder image current detector.
Figure 3:
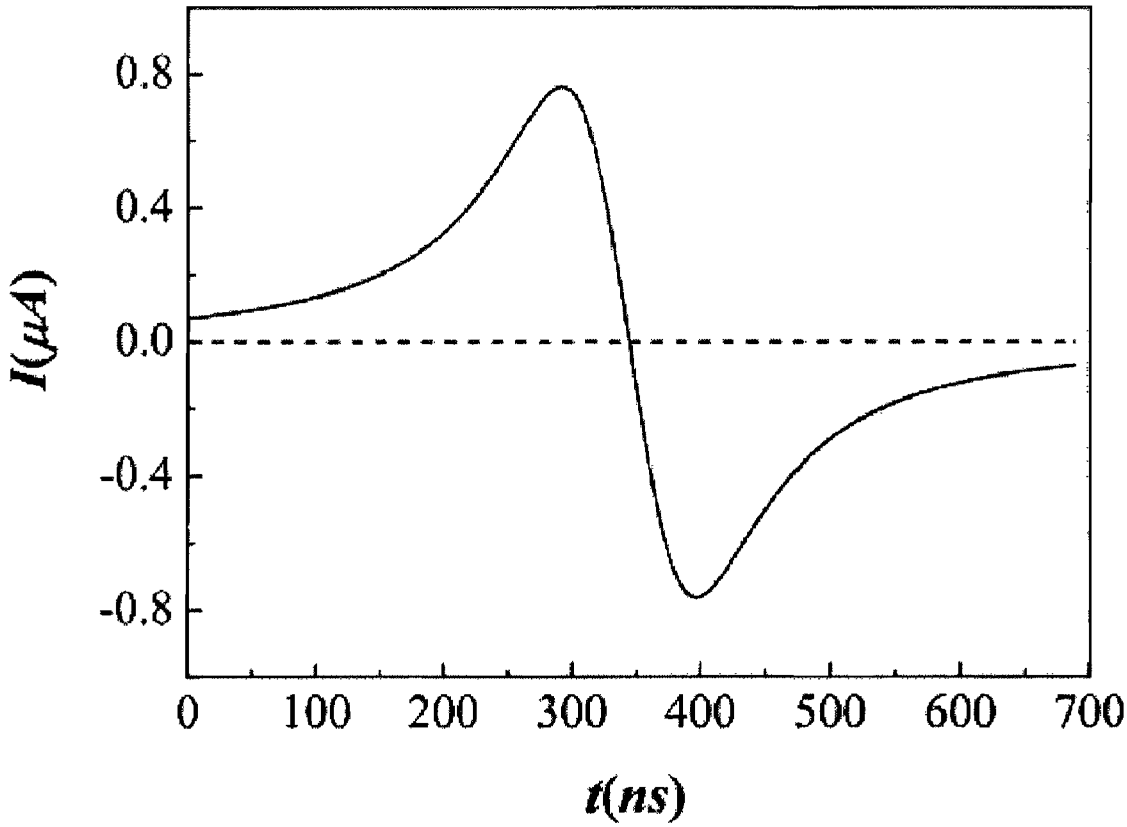
FIG. 3 illustrates an output current signal of a single-cylinder image current detector when positive charges pass through the detector.
Figure 4:
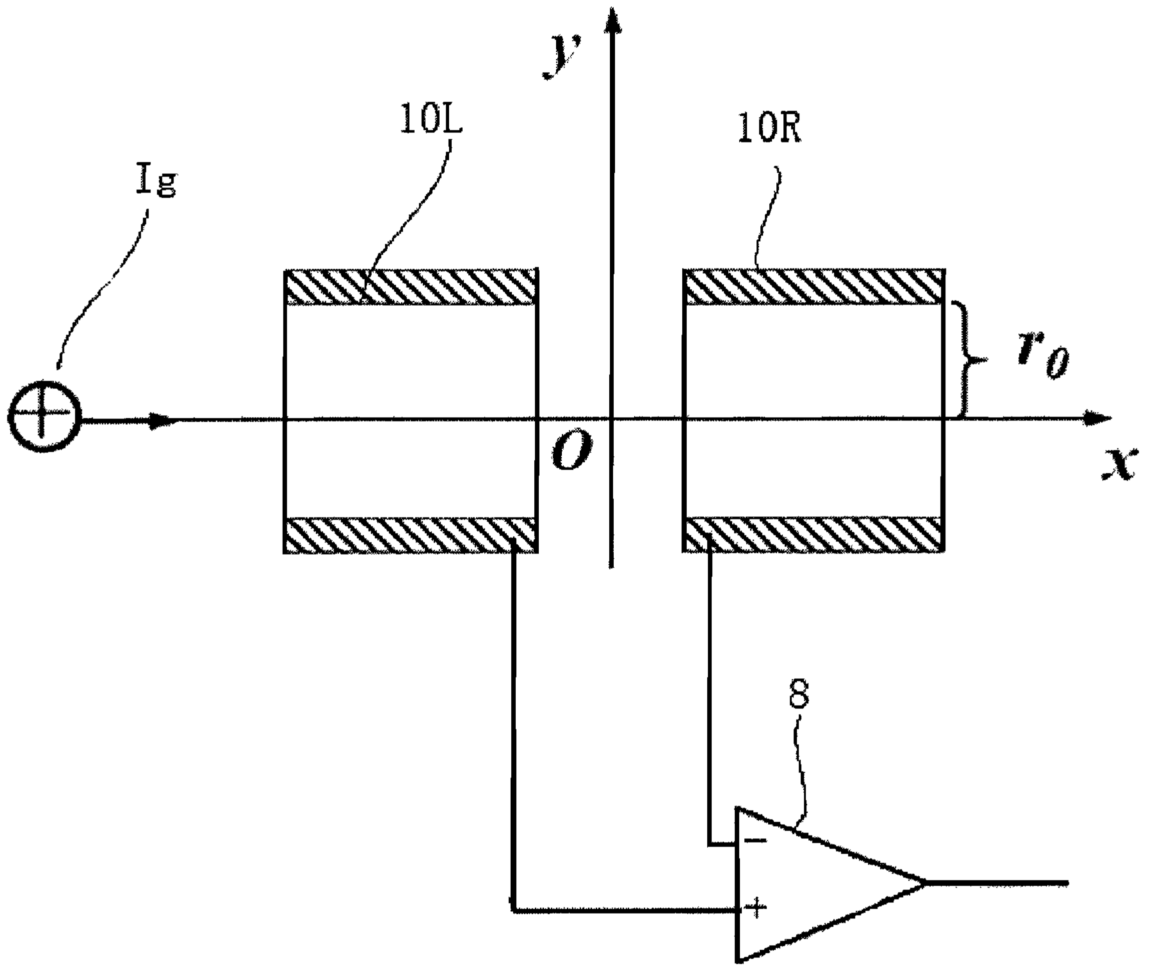
FIG. 4 illustrates a dual-cylinder image current detector and a waveform output by an amplifier (or a current-to-voltage converter)
Figure 5:
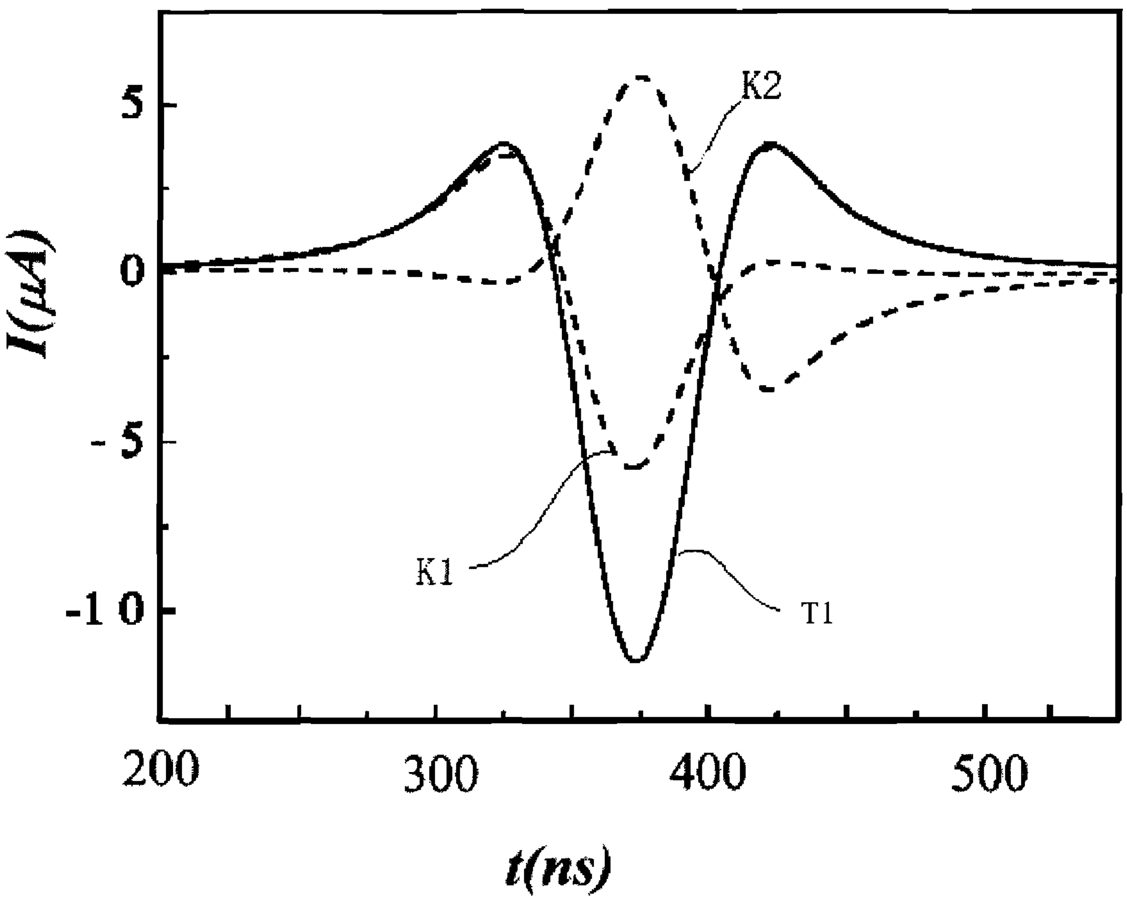
FIG. 5 illustrates output currents picked up at a left cylinder and a right cylinder of a dual-cylinder image current detector when positive charges pass through the detector, and a signal acquired after left-right differentiation.

If an existing single-cylinder detector shown in FIG. 2 is placed in the drift space 7, a detected image current signal waveform is as shown in FIG. 3, and the waveform is independent of the direction of movement of the ions. If a dual-cylinder detector shown in FIG. 4 is used, a group of ions Ig enters through a cylinder 10L, and image current signal waveforms are as shown in FIG. 5. The signal waveform detected by the left cylinder is a dotted line K1, the signal waveform detected by a right cylinder 10R is a dotted line K2, and T1 is a difference between the two waveforms (K1−K2). The waveform T1 has a sharp negative peak. On the contrary, if the ions enter from the right side, the right cylinder 10R detects the signal waveform represented by the dotted line K1, the left cylinder 10L detects the signal waveform represented by the dotted line K2, and a positive peak signal output opposite to the waveform T1 is acquired based on the difference between the two waveforms. Therefore, the dual-cylinder detection can discern the direction of ions' motion.

A differential signal can be acquired by different methods. A differential amplifier 4 may be used to amplify an induced current on the cylinders 10 (10L, 10R) directly as shown in FIG. 4. It is also possible to respectively amplify the induced currents on the two cylinders 10 (10L, 10R) to generate two signals and then acquire difference of signals by using a differential amplifier.

Figure 6:
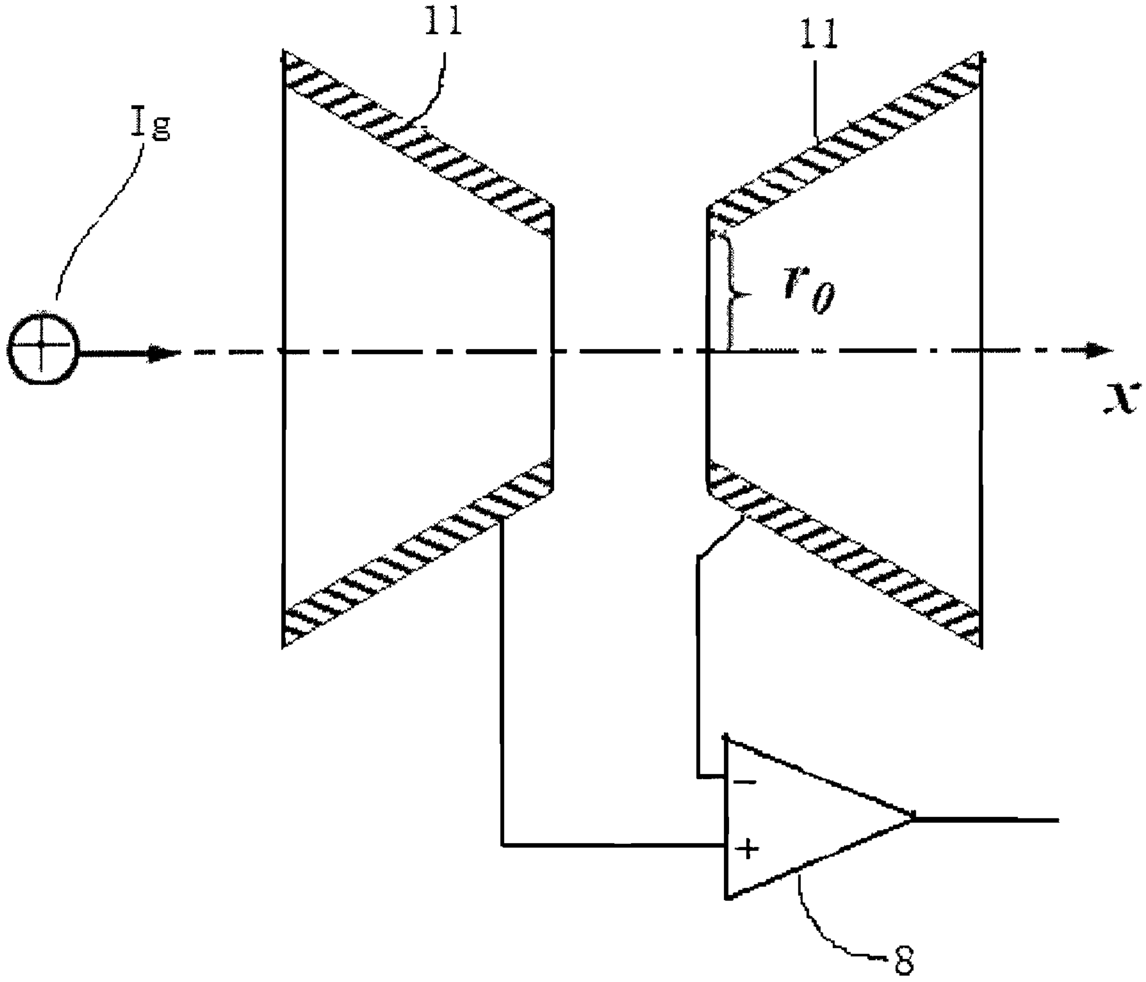
FIG. 6 illustrates a dual-cone image current detector.
Figure 7:
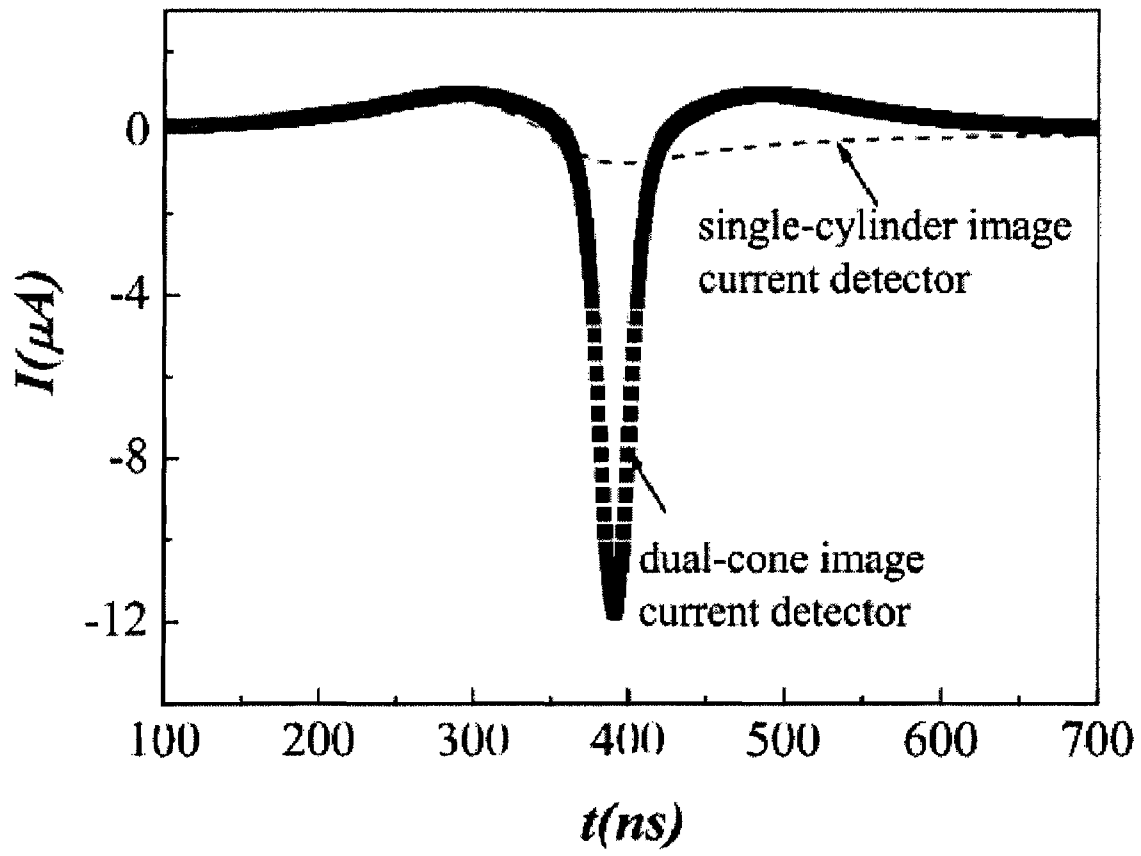
FIG. 7 illustrates that a recoil wave (positive) of a differential signal decreases dramatically when positive charges pass through a dual-cone image current detector, in which a dotted line in the figure is an image current signal picked up by a single cylinder for comparison.

The waveform T1 in FIG. 5 has two small peaks in an opposite direction besides the sharp peak in the middle, and is easily confused with signals of other ion groups when no good analytical algorithm is available. If the dual-detector is made in two conical shapes as shown by 11 in FIG. 6, the differential waveform can be improved dramatically. FIG. 7 shows a differential current signal acquired when both cones are 10 mm long, and diameters of the smaller end of the cones are 4 mm, a distance between the two cones is 2 mm, and a half-opening angle of the cone is 45°. For comparison, the figure also provides an image current waveform (a dotted line) of the same ion group for a single cylinder with a diameter of 18 mm and a length of 7 mm. It can be seen that the dual-cylinder detection solution provided by the present invention has an obvious effect on increasing the signal intensity.

Figure 8:
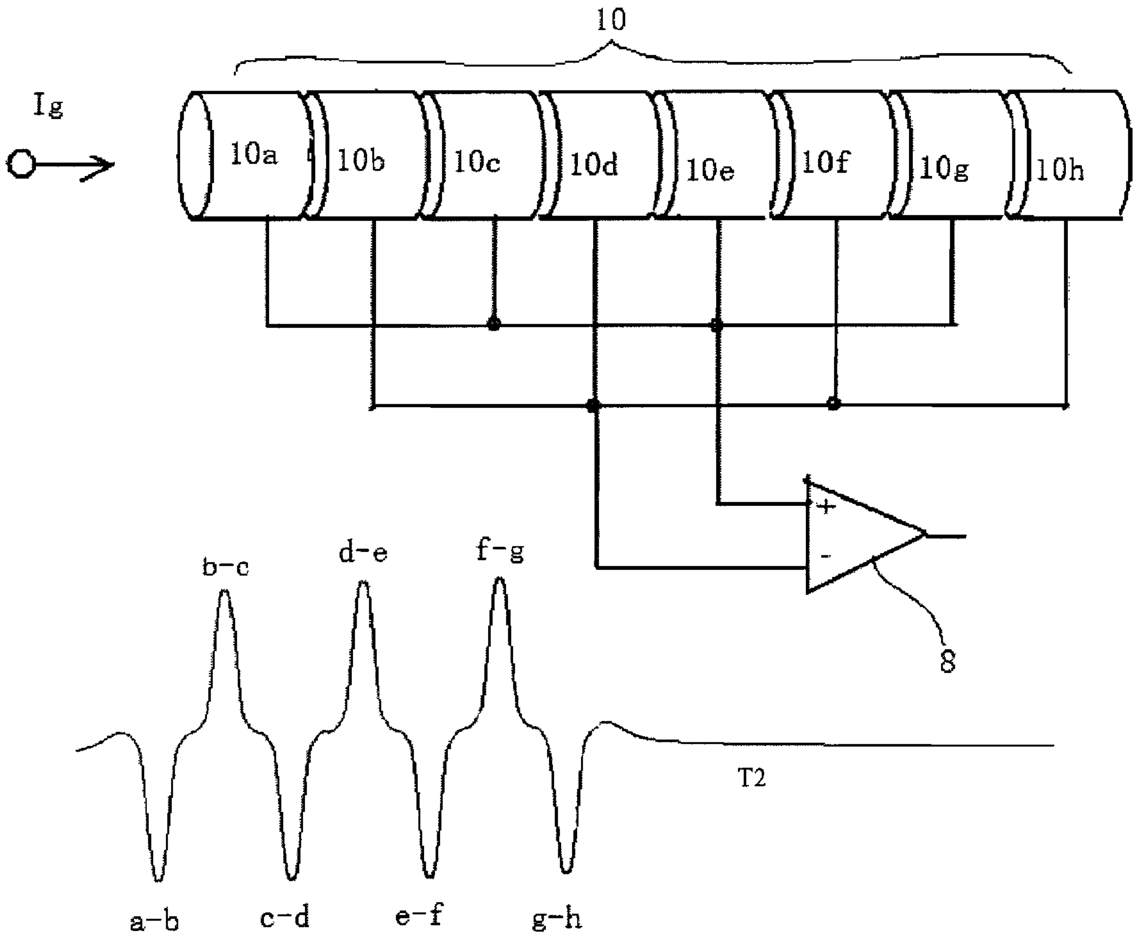
FIG. 8 illustrates an image current detector with a row of 8 cylinders and an exemplary signal pickup solution thereof, in which a lower part of the figure illustrates a signal waveform output by an amplifier.

In another embodiment of the present invention, the analyzer has a row of detectors. When ions pass through the row of detectors, not only a signal enhancement effect of differential sampling can be used, but also a sequence of image current pulses can be acquired within one moving cycle of the ions. As shown in FIG. 8, eight cylinders are placed in the field-free drift region, each of the cylinders has an inner diameter of 6 mm and a length of 7 mm, two adjacent cylinders are spaced from each other by 1 mm, and the cylinders are labeled from left to right as 10*a*, 10*b*, 10*c*, 10*d*, 10*e*, 10*f*, 10*g*, and 10*h*. The odd-numbered cylinders are connected together, and are connected to a positive input end of the differential amplifier 8; the even-numbered cylinders are connected together, and are connected to a negative input end of the differential amplifier 8. An ion group Ig moving from left to right at a constant velocity enters the cylinder sequence, each of the cylinders induces a pulse image current at a different moment, and by acquiring a difference between a sum of the image currents of the odd-numbered cylinders and a sum of the image currents of the even-numbered cylinders, a pulse signal sequence like a waveform T2 can be acquired at an output end of the differential amplifier 8. The two letter symbol on each pulse in the waveform T2 respectively indicates that the pulse is generated when they enter the cylinder indicated by the second letter from the cylinder indicated by the first letter. For example, a negative pulse a-b is generated when the ions enter the cylinder b from the cylinder a, a positive pulse b-c is generated when the ions enter the cylinder c from the cylinder b, and so on.

Figure 9:
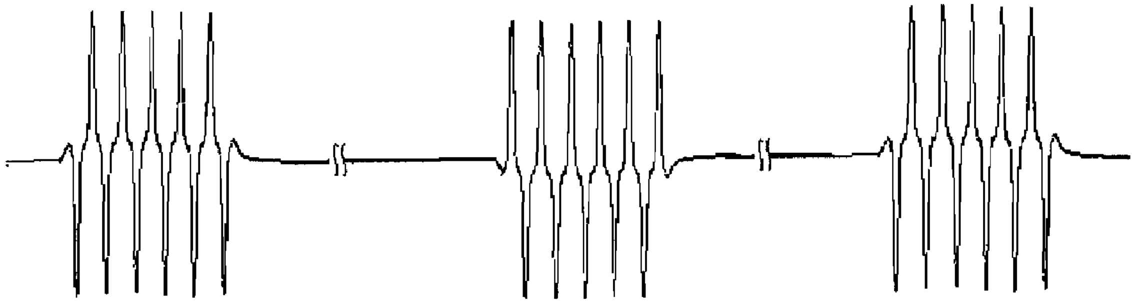
FIG. 9 illustrates signal waveforms output by a multi-cylinder image current detector when an ion group moves to and fro in a multi-turn flight tube.

The number of the cylinder levels in the detector is not limited to 8, and should be as large as possible if the length of the ion flight region and focusing characteristics of the ion beam allow. When the ion group oscillates to and fro between two reflectors, the detector in the drift region picks up the pulse sequence signal continuously, thereby forming a wave packet string shown in FIG. 9. A pair of wave packets corresponds to a cycle of the ions motion. The distance between two pairs of wave packets reflects an oscillation period of the ions in the flight tube, and is in direct proportion to a square root of a mass-to-charge ratio $\sqrt{m/z}$. Meanwhile, a pulse interval within each of the wave packets reflects the time taken by the ion group to pass through each of the cylinders. If the pitch of the cylinder is l, and an acceleration voltage of the ions before entering the flight tube is U, the pulse interval within the wave packet is:

$$\Delta t = \frac{l}{\sqrt{2U}}\sqrt{\frac{m}{2e}}.$$

Therefore, two timings (or frequencies) in the waveform are related to the mass-to-charge ratio of the ions. A mass spectrum can be obtained by conversion of the wave packet sequence using a certain mathematical algorithm.

Figure 10:
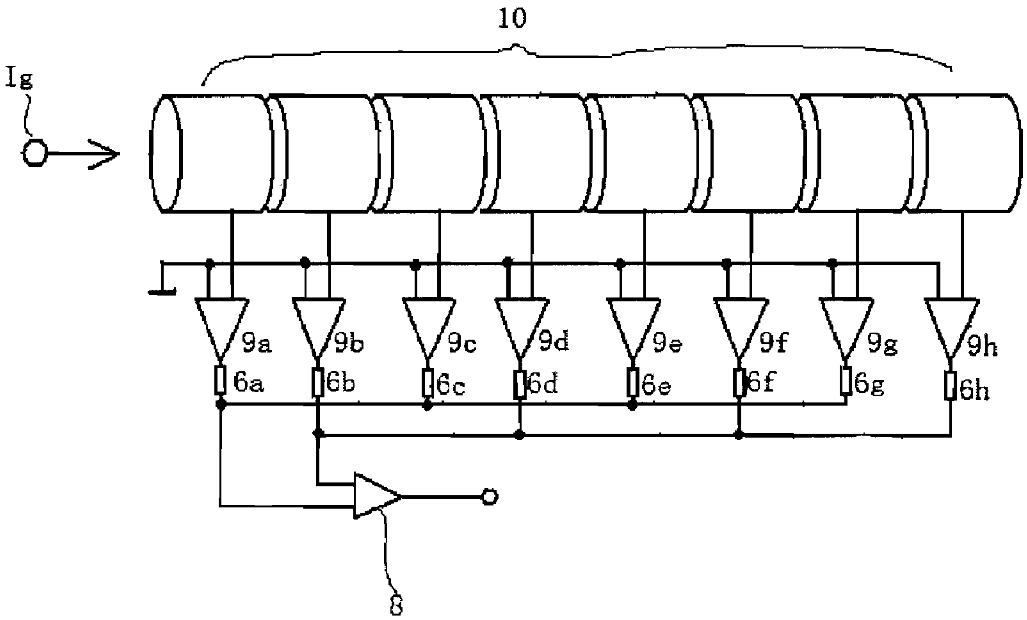
FIG. 10 illustrates another exemplary signal pickup solution of a multi-cylinder image current detector.

From the point of view of electronics, if low-noise amplifiers can be arranged into an array and placed near the cylinder array of the detector, the signal-to-noise ratio can be further increased. As shown in FIG. 10, each of the cylinders of the detector is connected to one of low-noise amplifiers 9*a* to 9*h*. Output ends of the amplifiers of the odd-numbered cylinders join together at a point through resistors 6*a*, 6*c*, 6*e*, and 6*g*, and are connected to a positive input end of a next level differential amplifier 8; output ends of the amplifiers of the even-numbered cylinders join together at a point through resistors 6*b*, 6*d*, 6*f*, and 6*h*, and are connected to a negative input end of the next level differential amplifier 8. At last, the differential amplifier provides an overall output signal.

Figure 11:
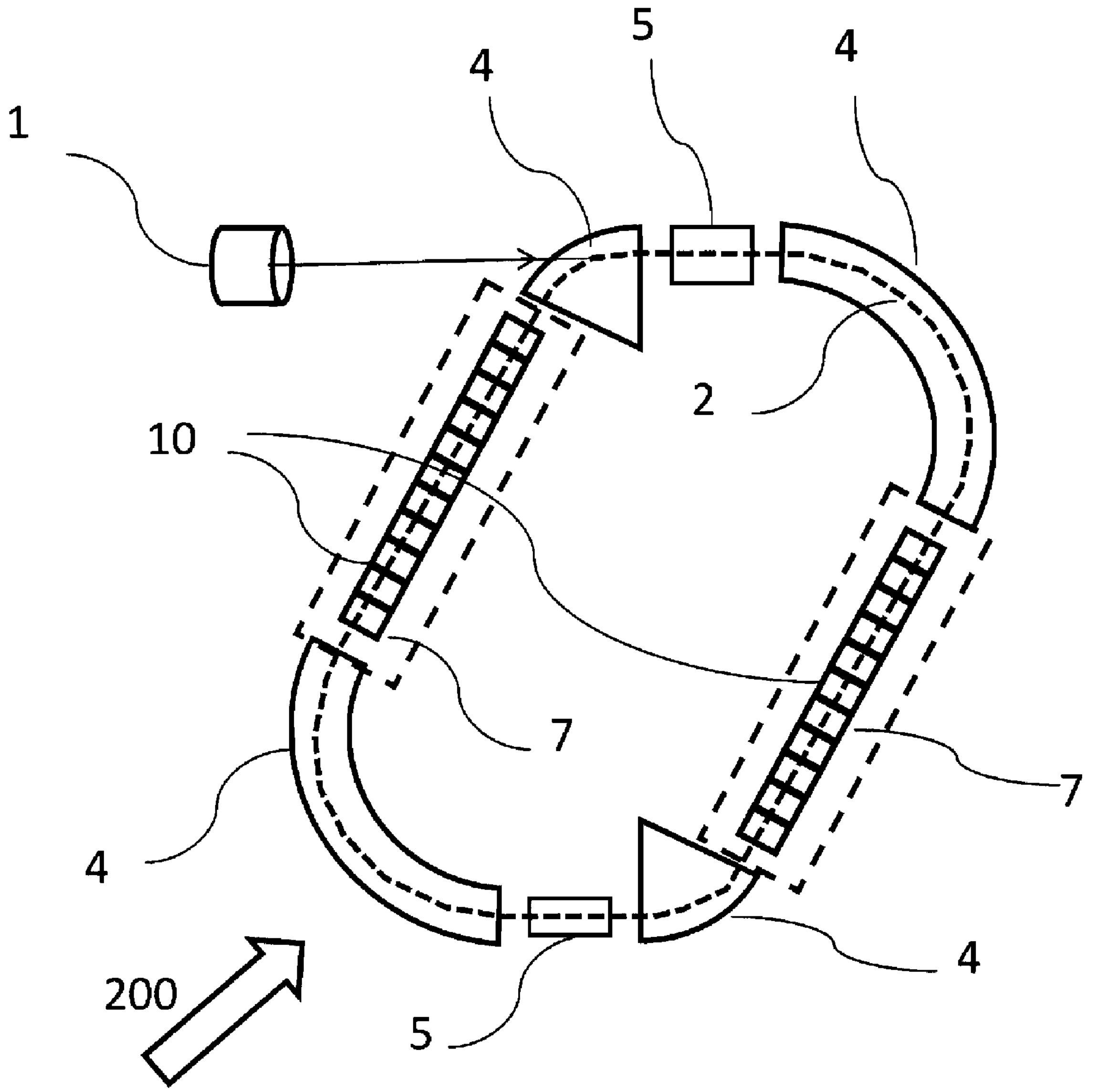
FIG. 11 illustrates an embodiment of using a multi-cylinder image current detector for sampling in a loop-orbit multi-turn flight tube.

Another configuration example of the present invention is as shown in FIG. 11. A circular multi-turn flight tube 200 in the figure is in the shape of a closed orbit, and includes an electrostatic deflector 4, focusing lenses 5, and two drift regions 7. Ions are generated by the pulsed ion source 1. By a method of switching off or restoring a voltage of the deflector 4, the ions generated by the ion source 1 are injected into the flight tube in the shape of the closed orbit, and circulate in the flight tube repeatedly. A row of cylinder detectors 10 is mounted in each of the flight regions. Each time the ion group pass through the cylinder defector, an amplifier (not shown) connected to the cylinder detector outputs a wave packet signal. The row of cylinder detectors 10 may be divided into two groups. Output signals of the two groups of cylinder detectors may be used respectively, or may be added together after certain phase shift adjustment and for further usage.

In view of the above, in the present invention, the ion optical system which ion beam can repeatedly travel within may adopt electrostatic ion reflectors, electrostatic ion deflecting devices, or a combination thereof with electrostatic focusing lenses.

After an enhanced image current signal in time domain is acquired by using the above solutions, the image current time domain signal needs to be processed by a certain data conversion method, so as to obtain a mass spectrum of trapped ions. It can be seen from the above descriptions that an image current signal of an ion group of certain mass is not a sine function or a cosine function, and the frequency spectrum thereof includes various high harmonics. It is of no doubt that we may take any order of harmonic components in the frequency spectrum by using the Fourier transform to reassemble the mass spectrum using the relationship between a harmonic signal spectral line and a mass-to-charge ratio. Also, using high harmonic spectral lines to represent the mass spectrum has advantage of achieving high mass resolution, and this has been proved experimentally by K G Buhshan et al. in *Electrostatic Ion Trap and Fourier Transform Measurements for High-Resolution Mass Spectrometry*, REVIEW OF SCIENTIFIC INSTRUMENTS 78, 083302 (2007). However, when the analyzer is used to analyze ions of a wide mass range, different harmonic spectral lines of different ions may overlap. For example, a second harmonic frequency of image current from ions of mass-to-charge ratio 200 is smaller than a second harmonic frequency of ions of mass-to-charge ratio 100, but the third harmonic frequency of the image current from ions of mass-to-charge ratio 200 is greater than the second harmonic frequency of the ions of mass-to-charge ratio 100. For the case of a complex mixture of different ions, performing the Fourier transform to the image current will not give a mass spectrum. Instead a complex spectrum having certain relation to a specific mass spectrum is given. Therefore, two new methods for converting an image current into a mass spectrum are further provided herewith.

Digital Fast Fourier Transform Method Plus Stepwise Spectrum Deconvolution Method In the method, first, for every possible mass $m_j$, a time domain function (a mass basis function) for image current signal is acquired by derivation, measurement, or computer simulation, and a complex frequency spectrum distribution thereof is acquired by using a digital fast Fourier transform, so that a ratio of the complex coefficient of each order of harmonic in a discrete spectrum to the complex coefficient of the base frequency can be obtained. Digital fast Fourier transform is performed on image current signal for actual sample acquired with analog-to-digital converter. A lower frequency limit of the Fourier transform has to be set lower than a base frequency of oscillation of an ion of maximum possible mass.

Now, spectrum conversion starts from a lower end of a spectrum. For a first non-zero peak value, a complex value distribution of its all high harmonics thereof are calculated using the ratio of coefficient above mentioned for corresponding high harmonic point, and the acquired complex value distribution is deducted from the original complex spectrum. Then, a next non-zero peak value is found in the remnant spectrum distribution after deduction. For this peak value, a complex value distribution of its high harmonic thereof are calculated, using the ratio of a complex coefficient, and the acquired complex value distribution is deducted from the complex spectrum obtained after the previous deduction, and so on, until the whole spectrum is processed. A combination of the acquired non-zero peak values forms an expected mass spectrum. Definitely, in order to avoid calculation errors in the process of acquiring the complex value distribution of the high harmonics of the non-zero base frequencies, proper checking and adjustment are performed during each deduction. For example, it is checked whether a modulus of the remaining spectrum become negative, or it is adjusted and checked whether a sum of squares of moduli of the remaining spectrum is getting a minimal.

When a base frequency component is far smaller than some high harmonic components (for example, in an image current signal provided by a dual-cylinder detector shown in FIG. 4, a base frequency component is very small, and only reaches a maximum value during the $20^{th}$ to $30^{th}$ harmonics), and especially when an ion number of certain mass is very small, the stepwise deconvolution method of high harmonics (sometimes also referred to as a spectrum deconvolution method) may incur a very large error, and leave a very large noise on the mass spectrum. If the checking and adjustment procedure are not properly performed, the conversion method mainly uses a base frequency component of ion group of each mass and eliminate the interference of high components and it does not make full use of multiple harmonic components.

Method for Acquiring Basis Function Coefficients by Using a Least Square Method/Orthogonal Projection Method It is assumed that an overall image current signal collected at discrete time points is $I_i(t_i)$, where $t_{i+1}-t_i=\Delta t$ is the time step of sampling. For mass $m_j$ (j=1 to k), a time function of the image current signal $x_j=x_j(t_i)$ can be acquired by derivation, measurement, or computer simulation. These functions are so-called mass basis functions, and we may select $t_i$ with the same step as actual sampling time interval. It is then assumed that $m_{i+1}-m_i=\Delta m$ is a mass step selected during a conversion process, and a lower limit of the mass is set as $m_1$, and an upper limit of mass is set as $m_m$. Thus, signal conversion is to find a regression function:

$$Y_i=y(t_i)=a_0+a_1x_1(t_i)+a_2x_2(t_i)+\ldots a_kx_k(t_i)i=1\rightarrow N.$$

where, for all points $t_i$, $Y_i$ approaches $I_i$ with least square approximation. The resultant regression coefficient $a_j$ reflects intensity of ions of the mass $m_j$. In other words, data $(m_j, a_j)$ illustrates a mass spectrum corresponding to the signal $Y_i$.

The method is substantially equivalent to an orthogonal projection method in vector analysis, that is, a basis function $x_j=x_j(t_i)$ is regarded as a basis vector $x_j$, and independent basis vectors corresponding to k mass points span into a space V. If an image current I is incurred by some ions of the discrete mass, I∈V. However, in fact, ion mass does not fall on the discrete points strictly, and a mass spectrum peak may widen, and the signal may be mixed with a noise, so that the image current I does not belong to the space V, but an orthogonal projection Y thereof in the space V is a best approximation thereof.

$$Y=\sum_{j=1}^{k}a_jx_j$$

It can be proved that a method for acquiring the coefficient $a_j$ is the same as the least square method, and both are required to solve a linear equation:

$$\sum_{j=1}^{k}\left[\sum_{i=1}^{N}x_j(t_i)x_m(t_i)\right]a_j=\sum_{i=1}^{N}I(t_i)x_m(t_i)$$

where m=1→k, that is, k simultaneous equations exist.

As stated above, when the structure (for example, dimensions of reflectors and voltage parameters of each electrode) of the analyzer is determined, a discrete time function of an image current signal corresponding to mass $m_j$ may be acquired by mathematical derivation or analog computation, and in practice may also be acquired by experimental measurement on a standard sample.

For example, a mass-to-charge ratio of an ion group generated by an adopted standard sample is $m_b$, and a standard basis function $x_b(t)$ can be acquired by sampling an image current of the ion group. If discrete sampling is performed by using the same time scale during measurement, a discrete function $X_n=x_b(t_n)$ can be acquired. The velocity of an ion is in inverse proportion to the square root of the mass-to-charge ratio of the ion, so that a signal generated by an ion of the mass $m_j$ at time $t_i$ is the same as or is in direct proportion to a signal generated by a standard ion of the mass $m_b$ at time t, that is $$x_j(t_i)=A_jx_b(t)$$

$$t=\sqrt{\frac{m_b}{m_j}}\,t_i.$$

Definitely, t in the above equation does not necessarily fall on a discrete sampling time point $t_n$, but instead, for example, may fall between $t_n$ and $t_{n+1}$, and in this case, the basis function $x_j(t_j)$ can be acquired by only using an interpolation method, that is $$x_j(t_i)=A_j\left\{\frac{x_b(t_{n+1})(t-t_n)-x_b(t_n)(t_{n+1}-t_n)}{\Delta t}\right\}$$

where $A_j$ is a relative coefficient of image current response for ion $m_j$ to the standard sample ion $m_b$, and it is normally regarded that $A_j$ is in direct proportion to the velocity of an ion, that is $$A_j\sim\sqrt{\frac{m_b}{m_j}}.$$

The technical solutions involved in the present invention are described above step by step based on image current detection and signal conversion. The technical solutions can be used in combination to achieve an optimal effect, and achieve a mass spectrum of high sensitivity and high resolution. In fact, many other methods for signal conversion may be used. For example, for a multi-cylinder detector shown in FIG. 8, the Fourier transform can be used to acquire a spectrum of oscillation of ions in whole flight tube and the pulse spectrum in the wave packet, which are both converted into a mass spectrum respectively, and the mass spectrums are superposed. As long as multiple frequency components in an output time domain signal can be fully used, a signal-to-noise ratio better than that of a Fourier transform mass spectrum of an image current acquired by using a single-cylinder detector can be acquired.

To sum up, multiple image current pulses can be provided within one reciprocating/circular movement cycle of ions by using multiple tubular electrode detectors, so that the number of times and amplitude of signal pickup is increased, and the signal-to-noise ratio of a mass spectrum acquired after data processing is increased. In the above embodiments, the cross section of the ion beam is round, so that a multi-cylinder detector is used. For different designs of electrostatic flight tubes, the cylinder of the detector may also be changed into a tubular electrode with a cross section of another shape, for example, a rectangular tube, which is still encompassed by the idea of the present invention. The data processing method for converting a time domain signal into a mass spectrum data is merely briefly described herein. In the embodiments, the signal deconvolution is performed in a frequency domain, and the least square method is performed in a time domain. Persons skilled in the art may also perform the signal deconvolution in the time domain, or perform the least square method in the frequency domain for constructing of mass spectrum. In addition, other methods, such as wavelet analysis, may be adopted. Therefore, the scope of the present invention is not limited to the above embodiments, but is as defined by the claims.

What is claimed is:

1. A mass spectrometric analyzer, comprising:

electrostatic reflectors or electrostatic deflectors, enabling pulsed ions to be analyzed to move periodically for multiple times in an ion flight region, forming time focusing in portions of the ion flight region thereof, and forming an confined ion beam;

a plurality of tubular detectors disposed in the portions of the ion flight region in which the time focusing is formed, and arranged in series along an axial direction of the ion beam, for picking up image currents when the ions pass through the plurality of tubular detectors;

a low-noise electronic amplification device electrically connected to the tubular detectors, for detecting the image currents picked up by the plurality of tubular detectors differentially to acquire differential image current signals; and a signal processing device, for converting the image current signal into a mass spectrum.

2. The mass spectrometric analyzer according to claim 1, wherein the plurality of tubular detectors comprises a pair of tubular detectors, wherein the low-noise electronic amplification device comprises a differential amplifier, and each of two input ends of the differential amplifier are respectively connected to one of the pair of tubular detectors.

3. The mass spectrometric analyzer according to claim 2, wherein the pair of tubular detectors is in shape of symmetrically placed cones, wherein the inner diameters of two ends of the pair of tubular detectors close to each other are smaller and inner diameters of two ends of the pair of tubular detectors departing from each other are larger, and an angle formed by a generatrix and an axis of the cone ranges from 25° to 55°.

4. The mass spectrometric analyzer according to claim 1, wherein the electronic amplification device comprises a low-noise amplifier connected between the tubular detectors and a differential detection circuit, for amplifying the image currents picked up by the tubular detectors before the differential detection circuit acquires the differential image current signal.

5. The mass spectrometric analyzer according to claim 1, wherein the electronic amplification device comprises a differential amplifier, and wherein, among the plurality of tubular detectors arranged in series along the axial direction of the ion beam, the image currents picked up by some tubular detectors of the plurality of tubular detectors congregate to a first input end of the differential amplifier, and the image currents picked up by the other tubular detectors of the plurality of tubular detectors congregate to a second input end of the differential amplifier.

6. The mass spectrometric analyzer according to claim 5, wherein, among the plurality of tubular detectors arranged in series along the axial direction of the ion beam, the tubular detectors that congregate the image currents to the first input end of the differential amplifier are odd-numbered tubular detectors in series along the axial direction, and the tubular detectors that congregate the image currents to the second input end of the differential amplifier are even-numbered tubular detectors in said series along the axial direction.

7. A method for mass spectrometric analysis of ions, comprising:

creating or accelerating ions to be analyzed by a pulsed means;

disposing a flight tube analyzer including electrostatic reflectors or electrostatic deflector, so as to enable the pulsed ions to move therein periodically for multiple times, form time focusing in portions of the ion flight region thereof, and form a confined ion beam in space;

in said portions of the ion flight region, enabling the ion beam to pass through multiple tubular detectors arranged in series along the axial direction of the ion beam periodically, wherein the tubular detectors pick up image currents when the ions pass through the multiple tubular detectors;

by using a low-noise electronic amplification device, detecting the image currents picked up by the multiple tubular detectors differentially; and processing an output signal of the electronic amplification device to obtain a mass spectrum thereof.

8. The mass spectrometric analysis method according to claim 7, wherein the step of detecting the image currents picked up by the multiple tubular detectors differentially comprises:

inputting the image currents picked up by the odd-numbered tubular detectors among the multiple tubular detectors to a first input end of a differential amplifier; and inputting the image currents picked up by the even-numbered tubular detectors among the multiple tubular detectors to a second input end of the differential amplifier.

9. The mass spectrometric analysis method according to claim 7, wherein the step of detecting the image currents picked up by the multiple tubular detectors differentially comprises using low-noise amplifiers to amplify the image currents picked up by the corresponding detectors respectively, acquiring a difference between a sum of outputs of the odd-numbered low-noise amplifiers and a sum of outputs of the even-numbered low-noise amplifiers, and amplifying the difference, so as to form an output signal.

10. The mass spectrometric analysis method according to claim 7, wherein the step of processing the output signal of the electronic amplification device comprises a digital fast Fourier transformation.

11. The mass spectrometric analysis method according to claim 7, wherein the step of processing the output signal of the electronic amplification device comprises a spectral deconvolution method.

12. The mass spectrometric analysis method according to claim 7, wherein the step of processing the output signal of the electronic amplification device utilizes multiple harmonic components of the output signal in constructing each mass-to-charge ratio point in the mass spectrum.

13. The mass spectrometric analysis method according to claim 7, wherein the step of processing the output signal of the electronic amplification device comprises an orthogonal projection method.

14. The mass spectrometric analysis method according to claim 13, wherein the orthogonal projection method is mathematically equivalent to a least square regression method.

15. The mass spectrometric analysis method according to claim 7, wherein the step of processing the output signal of the electric amplification device comprises wavelet analysis.

* * * * *